US012786724B2

(12) United States Patent
Davis et al.

(10) Patent No.: US 12,786,724 B2
(45) Date of Patent: Nov. 3, 2026

(54) COMMUNICATION BETWEEN A WIRELESS DUST EXTRACTOR AND A POWER TOOL

(71) Applicant: MILWAUKEE ELECTRIC TOOL CORPORATION, Brookfield, WI (US)

(72) Inventors: Anthony M. Davis, Brookfield, WI (US); David R. Perreault, Menomonee Falls, WI (US); Matthew J. Halenka, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 29 days.

(21) Appl. No.: 19/082,507

(22) Filed: Mar. 18, 2025

(65) Prior Publication Data

US 2025/0220737 A1 Jul. 3, 2025

Related U.S. Application Data

(63) Continuation of application No. 17/672,451, filed on Feb. 15, 2022, now Pat. No. 12,273,937.

(Continued)

(51) Int. Cl.
*H04W 12/50* (2021.01)
*H04W 12/06* (2021.01)
(Continued)

(52) U.S. Cl.
CPC ........... *H04W 12/50* (2021.01); *H04W 12/06* (2013.01); *H04W 76/11* (2018.02); *A47L 7/00* (2013.01);
(Continued)

(58) Field of Classification Search
None
See application file for complete search history.

(56) References Cited

U.S. PATENT DOCUMENTS 3,626,545 A 12/1971 Sparrow
4,306,329 A 12/1981 Yokoi
(Continued)

FOREIGN PATENT DOCUMENTS

CA 2786726 A1 11/2005
CN 201086970 Y 7/2008
(Continued)

OTHER PUBLICATIONS

Bluetooth, “Specification of the Bluetooth System.” Version 4.0, vol. 0, published Jun. 30, 2010, 2302 pages.
(Continued)

*Primary Examiner* — Ali H. Cheema
(74) *Attorney, Agent, or Firm* — Michael Best & Friedrich LLP

(57) ABSTRACT

Systems and methods for establishing a wireless connection using a connection identifier. The systems include a dust extractor and a power tool. The dust extractor includes an extractor electronic processor. The power tool includes a tool electronic processor. The extractor electronic processor is configured to: broadcast a connection advertisement; establish the wireless connection with a power tool when the connection advertisement is received; receive a request for the connection identifier; and provide a response including the connection identifier; provide a first indication of a successful wireless connection. The tool electronic processor is configured to: search for the connection advertisement broadcast from the dust extractor; establish the wireless connection with the dust extractor when the connection advertisement is received; provide the request for the connection identifier to the dust extractor; receive the response from the dust extractor; and provide a second indication of the successful wireless connection.

19 Claims, 7 Drawing Sheets

Related U.S. Application Data

(60) Provisional application No. 63/149,796, filed on Feb. 16, 2021.

(51) Int. Cl.

| | |
|---|---|
| ***H04W 76/11*** | (2018.01) |
| *A47L 7/00* | (2006.01) |
| *A47L 9/28* | (2006.01) |
| *H04W 4/80* | (2018.01) |
| *H04W 8/00* | (2009.01) |
| *H04W 76/10* | (2018.01) |

(52) U.S. Cl.

CPC .................. *A47L 9/28* (2013.01); *H04W 4/80* (2018.02); *H04W 8/005* (2013.01); *H04W 76/10* (2018.02)

(56) References Cited

U.S. PATENT DOCUMENTS

| | | | |
|---|---|---|---|
| 4,369,543 | A | 1/1983 | Chen et al. |
| 5,120,983 | A | 6/1992 | Sämann |
| 5,237,896 | A | 8/1993 | Albright et al. |
| 5,256,906 | A | 10/1993 | Tsuge et al. |
| 5,274,878 | A | 1/1994 | Radabaugh et al. |
| 5,606,767 | A | 3/1997 | Crlenjak et al. |
| 5,709,007 | A | 1/1998 | Chiang |
| 5,833,524 | A * | 11/1998 | Satoh .................... B24B 55/105 285/402 |
| 5,839,156 | A | 11/1998 | Park et al. |
| 5,903,462 | A | 5/1999 | Wagner et al. |
| 6,044,519 | A | 4/2000 | Hendrix |
| 6,222,285 | B1 | 4/2001 | Haley et al. |
| 6,424,799 | B1 | 7/2002 | Gilmore |
| 6,514,131 | B1 * | 2/2003 | Reich ................. B23Q 11/0046 451/344 |
| 6,536,536 | B1 | 3/2003 | Gass et al. |
| 6,607,041 | B2 | 8/2003 | Suzuki et al. |
| 6,615,930 | B2 | 9/2003 | Bongers-Ambrosius et al. |
| 6,675,196 | B1 | 1/2004 | Kronz |
| 6,834,730 | B2 | 12/2004 | Gass et al. |
| 6,836,614 | B2 | 12/2004 | Gilmore |
| 6,845,279 | B1 | 1/2005 | Gilmore et al. |
| 6,851,900 | B2 | 2/2005 | Tillemans et al. |
| 6,856,113 | B1 | 2/2005 | Cunningham |
| 6,913,087 | B1 | 7/2005 | Brotto et al. |
| 6,967,972 | B1 | 11/2005 | Volftsun et al. |
| 7,036,605 | B2 | 5/2006 | Suzuki et al. |
| 7,036,703 | B2 | 5/2006 | Grazioli et al. |
| 7,040,972 | B2 | 5/2006 | Hoffmann et al. |
| 7,054,696 | B2 | 5/2006 | Crowell |
| 7,093,668 | B2 | 8/2006 | Gass et al. |
| 7,102,303 | B2 | 9/2006 | Brotto |
| 7,112,934 | B2 | 9/2006 | Gilmore |
| 7,121,358 | B2 | 10/2006 | Gass et al. |
| 7,146,677 | B2 | 12/2006 | Litomisky et al. |
| 7,243,152 | B2 | 7/2007 | Guggisberg |
| 7,290,997 | B2 | 11/2007 | Hinzpeter et al. |
| 7,296,323 | B2 | 11/2007 | Hayama et al. |
| 7,298,240 | B2 | 11/2007 | Lamar |
| 7,328,752 | B2 | 2/2008 | Gass et al. |
| 7,330,129 | B2 | 2/2008 | Crowell et al. |
| 7,346,406 | B2 | 3/2008 | Brotto et al. |
| 7,346,422 | B2 | 3/2008 | Tsuchiya et al. |
| 7,391,326 | B2 | 6/2008 | Puzio et al. |
| 7,403,360 | B2 | 7/2008 | Cunningham |
| 7,437,204 | B2 | 10/2008 | Lev-Ami et al. |
| 7,540,334 | B2 | 6/2009 | Gass et al. |
| 7,613,590 | B2 | 11/2009 | Brown |
| 7,644,469 | B2 | 1/2010 | Beers et al. |
| 7,646,155 | B2 | 1/2010 | Woods et al. |
| 7,688,028 | B2 | 3/2010 | Phillips et al. |
| 7,721,006 | B2 | 5/2010 | Morrow |
| 7,723,952 | B2 | 5/2010 | Phillips et al. |
| 7,750,811 | B2 | 7/2010 | Puzio et al. |
| 7,809,495 | B2 | 10/2010 | Leufen |
| 7,834,566 | B2 | 11/2010 | Woods et al. |
| 7,868,591 | B2 | 1/2011 | Phillips et al. |
| 7,871,463 | B2 | 1/2011 | Hayama et al. |
| 7,896,098 | B2 | 3/2011 | Suzuki et al. |
| 7,928,673 | B2 | 4/2011 | Woods et al. |
| 7,947,099 | B2 | 5/2011 | Valentini |
| 7,953,965 | B2 | 5/2011 | Qin et al. |
| 7,983,789 | B2 | 7/2011 | Lutz et al. |
| 8,004,664 | B2 | 8/2011 | Etter et al. |
| 8,005,647 | B2 | 8/2011 | Armstrong et al. |
| 8,015,657 | B2 | 9/2011 | Beers et al. |
| 8,067,916 | B2 | 11/2011 | Auh et al. |
| 8,169,298 | B2 | 5/2012 | Wiesner et al. |
| 8,210,275 | B2 | 7/2012 | Suzuki et al. |
| 8,294,424 | B2 | 10/2012 | Bucur |
| 8,310,206 | B2 | 11/2012 | Bucur |
| 8,443,485 | B2 | 5/2013 | Kunz et al. |
| 8,561,623 | B2 | 10/2013 | Lowenstein |
| 8,584,310 | B2 | 11/2013 | Beers et al. |
| 8,800,103 | B2 | 8/2014 | Hong et al. |
| 8,800,682 | B2 * | 8/2014 | Walker .................... B24B 55/10 173/198 |
| 9,055,033 | B2 | 6/2015 | Mergener |
| 9,073,160 | B2 | 7/2015 | Appel et al. |
| 9,108,285 | B2 | 8/2015 | Usselman |
| 9,189,663 | B2 | 11/2015 | Goren et al. |
| 9,406,915 | B2 | 8/2016 | White et al. |
| 9,409,273 | B2 | 8/2016 | Brown et al. |
| 9,430,370 | B2 | 8/2016 | Mergener |
| 9,449,268 | B2 | 9/2016 | Goren et al. |
| 9,466,198 | B2 | 10/2016 | Burch et al. |
| 9,537,335 | B2 | 1/2017 | Furui et al. |
| 9,547,965 | B2 | 1/2017 | Goren et al. |
| 9,577,450 | B2 | 2/2017 | Yoshikawa et al. |
| 9,595,839 | B2 | 3/2017 | Furui et al. |
| 9,608,472 | B2 | 3/2017 | Moshfeghi |
| 9,652,217 | B2 | 5/2017 | Winkler et al. |
| 9,672,708 | B2 | 6/2017 | Goren et al. |
| 9,693,667 | B2 | 7/2017 | Cunningham |
| 9,700,997 | B2 | 7/2017 | Schlegel et al. |
| 9,710,373 | B2 | 7/2017 | Mergener |
| 9,723,959 | B2 | 8/2017 | Suzuki |
| 9,756,402 | B2 | 9/2017 | Stampfl et al. |
| 9,779,601 | B2 | 10/2017 | Goren et al. |
| 9,780,583 | B2 | 10/2017 | Furui et al. |
| 9,819,132 | B2 | 11/2017 | Peloquin et al. |
| 9,855,632 | B2 * | 1/2018 | Rubens .............. B23Q 11/0046 |
| 9,875,629 | B2 | 1/2018 | Goren et al. |
| 9,906,045 | B2 | 2/2018 | Kim et al. |
| 9,916,739 | B2 | 3/2018 | Suzuki |
| 9,962,781 | B2 | 5/2018 | Suzuki |
| 9,979,149 | B2 | 5/2018 | Peloquin et al. |
| 10,039,137 | B2 | 7/2018 | Nguyen |
| 10,090,692 | B2 | 10/2018 | Yoshikawa et al. |
| 10,307,842 | B2 | 6/2019 | Suzuki |
| 10,369,444 | B1 | 8/2019 | Doucette |
| 10,369,644 | B2 | 8/2019 | Suzuki |
| 10,380,883 | B2 | 8/2019 | Matson et al. |
| 10,391,622 | B2 | 8/2019 | Tanaka et al. |
| 10,486,252 | B2 | 11/2019 | Suzuki |
| 10,493,577 | B2 * | 12/2019 | Furusawa .......... B23Q 11/0071 |
| 10,510,199 | B2 | 12/2019 | Hoossainy et al. |
| 10,582,824 | B2 | 3/2020 | Cunningham |
| 10,625,409 | B2 | 4/2020 | Tanaka et al. |
| 10,646,982 | B2 | 5/2020 | Dey, IV et al. |
| 10,994,351 | B2 | 5/2021 | Suzuki |
| 2001/0052416 | A1 | 12/2001 | Wissmach et al. |
| 2002/0143411 | A1 | 10/2002 | Varone et al. |
| 2002/0153855 | A1 | 10/2002 | Song et al. |
| 2003/0033686 | A1 | 2/2003 | Liu |
| 2003/0172310 | A1 | 9/2003 | Moyer |
| 2004/0199364 | A1 | 10/2004 | Law |
| 2005/0114718 | A1 | 5/2005 | Ito |
| 2005/0195930 | A1 | 9/2005 | Spital |
| 2005/0237189 | A1 | 10/2005 | Tani |
| 2005/0279213 | A1 | 12/2005 | Otto |
| 2006/0081291 | A1 | 4/2006 | Cunningham |
| 2006/0095158 | A1 | 5/2006 | Lee et al. |

(56) References Cited

U.S. PATENT DOCUMENTS

| | | | |
|---|---|---|---|
| 2006/0261749 A1 | 11/2006 | Campbell | |
| 2006/0293788 A1 | 12/2006 | Pogodin | |
| 2007/0283521 A1 | 12/2007 | Foster et al. | |
| 2008/0022479 A1 | 1/2008 | Zhao | |
| 2008/0184519 A1 | 8/2008 | Cunningham | |
| 2008/0287062 A1 | 11/2008 | Claus et al. | |
| 2009/0024757 A1 | 1/2009 | Proctor | |
| 2009/0058361 A1 | 3/2009 | John | |
| 2009/0217483 A1 | 9/2009 | Lee et al. | |
| 2009/0241283 A1 | 10/2009 | Loveless et al. | |
| 2009/0250364 A1 | 10/2009 | Gerold et al. | |
| 2009/0251330 A1 | 10/2009 | Gerold et al. | |
| 2009/0254203 A1 | 10/2009 | Gerold et al. | |
| 2009/0327391 A1 | 12/2009 | Park et al. | |
| 2009/0327543 A1 | 12/2009 | Teggatz et al. | |
| 2010/0096151 A1 | 4/2010 | Ostling | |
| 2010/0176766 A1 | 7/2010 | Brandner et al. | |
| 2010/0199453 A1* | 8/2010 | Brotto | A47L 7/0047 15/301 |
| 2011/0015764 A1 | 1/2011 | Chen et al. | |
| 2011/0056716 A1 | 3/2011 | Jonsson et al. | |
| 2011/0073343 A1 | 3/2011 | Sawano et al. | |
| 2011/0114345 A1 | 5/2011 | Schlesak et al. | |
| 2011/0283853 A1 | 11/2011 | Aoyama | |
| 2012/0073077 A1 | 3/2012 | Ishikawa et al. | |
| 2012/0083298 A1 | 4/2012 | Park et al. | |
| 2012/0100803 A1 | 4/2012 | Suumäki et al. | |
| 2012/0104991 A1 | 5/2012 | Suzuki et al. | |
| 2012/0187851 A1 | 7/2012 | Huggins et al. | |
| 2012/0238119 A1 | 9/2012 | Rejman et al. | |
| 2012/0239219 A1* | 9/2012 | Forbes, Jr. | G05F 1/66 700/295 |
| 2012/0302101 A1 | 11/2012 | Brotto et al. | |
| 2012/0312570 A1 | 12/2012 | Wanek et al. | |
| 2012/0325507 A1 | 12/2012 | Fluhrer et al. | |
| 2013/0005246 A1 | 1/2013 | Waters et al. | |
| 2013/0068255 A1 | 3/2013 | Heger | |
| 2013/0241699 A1 | 9/2013 | Covaro | |
| 2013/0257360 A1 | 10/2013 | Singh | |
| 2013/0288599 A1 | 10/2013 | Bernard et al. | |
| 2013/0331973 A1 | 12/2013 | Clark et al. | |
| 2014/0151079 A1 | 6/2014 | Furui et al. | |
| 2014/0158389 A1 | 6/2014 | Ito et al. | |
| 2014/0191664 A1 | 7/2014 | Johnson et al. | |
| 2014/0213179 A1 | 7/2014 | Rosenberg | |
| 2014/0237753 A1 | 8/2014 | Conrad | |
| 2014/0315487 A1 | 10/2014 | Lu | |
| 2014/0337952 A1 | 11/2014 | Bahr et al. | |
| 2015/0070142 A1 | 3/2015 | Miki et al. | |
| 2015/0162646 A1 | 6/2015 | Kawase et al. | |
| 2016/0049697 A1 | 2/2016 | McGee | |
| 2016/0080667 A1 | 3/2016 | Stuart et al. | |
| 2016/0085253 A1 | 3/2016 | Knight et al. | |
| 2016/0100724 A1 | 4/2016 | Valentini | |
| 2016/0116061 A1* | 4/2016 | Ammler | F16H 61/0031 701/51 |
| 2016/0151846 A1* | 6/2016 | Suzuki | B23D 59/0064 340/12.5 |
| 2016/0175895 A1* | 6/2016 | Suzuki | H04W 76/10 15/319 |
| 2016/0311094 A1 | 10/2016 | Mergener et al. | |
| 2016/0342142 A1 | 11/2016 | Boeck et al. | |
| 2016/0367266 A1 | 12/2016 | Palmerton et al. | |
| 2017/0007458 A1 | 1/2017 | Huh | |
| 2017/0057040 A1 | 3/2017 | Rzasa et al. | |
| 2017/0153631 A1 | 6/2017 | Jonsson | |
| 2017/0201853 A1 | 7/2017 | Chen et al. | |
| 2017/0201886 A1 | 7/2017 | Yang et al. | |
| 2017/0215113 A1 | 7/2017 | Lee et al. | |
| 2017/0223579 A1 | 8/2017 | Lee et al. | |
| 2017/0223615 A1* | 8/2017 | Lee | H04W 36/035 |
| 2017/0257472 A1 | 9/2017 | Gehring et al. | |
| 2017/0300406 A1 | 10/2017 | Mergener | |
| 2017/0326696 A1 | 11/2017 | Halverson | |
| 2018/0076639 A1 | 3/2018 | Furui et al. | |
| 2018/0114423 A1 | 4/2018 | Goren et al. | |
| 2018/0183596 A1* | 6/2018 | Deshpande | H04W 12/03 |
| 2019/0011892 A1 | 1/2019 | Post et al. | |
| 2019/0067756 A1 | 2/2019 | Lee et al. | |
| 2019/0070720 A1 | 3/2019 | Rabe et al. | |
| 2019/0097469 A1 | 3/2019 | Watanabe | |
| 2019/0098678 A1* | 3/2019 | Von Dentz | H04L 69/24 |
| 2019/0298122 A1* | 10/2019 | Tahara | A47L 7/0095 |
| 2020/0019134 A1* | 1/2020 | Post | G05B 19/0423 |
| 2020/0061726 A1 | 2/2020 | Suzuki | |
| 2020/0100638 A1* | 4/2020 | Caspar | A47L 9/2884 |
| 2020/0146520 A1 | 5/2020 | Caspar | |
| 2020/0215676 A1 | 7/2020 | Tanaka et al. | |
| 2020/0403544 A1* | 12/2020 | Ishikawa | B25B 21/00 |
| 2020/0412545 A1 | 12/2020 | Liu | |
| 2021/0022572 A1 | 1/2021 | Saur et al. | |
| 2021/0039179 A1 | 2/2021 | Suzuki | |
| 2021/0100417 A1 | 4/2021 | Tauber et al. | |
| 2021/0237252 A1* | 8/2021 | Ito | B25F 5/00 |

FOREIGN PATENT DOCUMENTS

| | | | |
|---|---|---|---|
| CN | 101234012 | A | 8/2008 |
| CN | 102490172 | A | 6/2012 |
| CN | 203042139 | U | 7/2013 |
| CN | 104076700 | A | 10/2014 |
| CN | 204241870 | U | 4/2015 |
| CN | 104706276 | A | 6/2015 |
| CN | 104749981 | A | 7/2015 |
| CN | 106385661 | A | 2/2017 |
| CN | 106909156 | A | 6/2017 |
| DE | 8808570 | U1 | 10/1988 |
| DE | 19902130 | A1 | 9/1999 |
| DE | 102012003073 | A1 | 8/2013 |
| DE | 102012003077 | A1 | 8/2013 |
| DE | 102013222313 | A1 | 5/2015 |
| DE | 202017104107 | U1 | 7/2017 |
| EP | 0371236 | A2 | 6/1990 |
| EP | 1016946 | B1 | 5/2006 |
| EP | 2229857 | A2 | 9/2010 |
| EP | 2233993 | A1 | 9/2010 |
| EP | 2234464 | A2 | 9/2010 |
| EP | 2628427 | A2 | 8/2013 |
| EP | 2628428 | A2 | 8/2013 |
| EP | 2628431 | A2 | 8/2013 |
| EP | 2687331 | A1 | 1/2014 |
| EP | 2878249 | A1 | 6/2015 |
| EP | 2946710 | A2 | 11/2015 |
| EP | 2962813 | A1 | 1/2016 |
| EP | 3159114 | A1 | 4/2017 |
| EP | 3272261 | A2 | 1/2018 |
| EP | 3272467 | A1 | 1/2018 |
| EP | 3415066 | A1 | 12/2018 |
| EP | 3528213 | A1 | 8/2019 |
| JP | H03128625 | A | 5/1991 |
| JP | H07222756 | A | 8/1995 |
| JP | 2001137158 | A | 5/2001 |
| JP | 2001161607 | A | 6/2001 |
| JP | 2001179705 | A | 7/2001 |
| JP | 2002209818 | A | 7/2002 |
| JP | 2002224631 | A | 8/2002 |
| JP | 2004195565 | A | 7/2004 |
| JP | 2005102791 | A | 4/2005 |
| JP | 2007063846 | A | 3/2007 |
| JP | 2007301344 | A | 11/2007 |
| JP | 2008000739 | A | 1/2008 |
| JP | 2008036723 | A | 2/2008 |
| JP | 2008220567 | A | 9/2008 |
| JP | 2009066690 | A | 4/2009 |
| JP | 2009083043 | A | 4/2009 |
| JP | 2010155302 | A | 7/2010 |
| JP | 4550357 | B2 | 9/2010 |
| JP | 2011079082 | A | 4/2011 |
| JP | 4955332 | B2 | 6/2012 |
| JP | 2014057635 | A | 4/2014 |
| JP | 2014200905 | A | 10/2014 |
| JP | 2014525840 | A | 10/2014 |
| JP | 5828110 | B2 | 12/2015 |

(56) References Cited

FOREIGN PATENT DOCUMENTS

| | | | | |
|---|---|---|---|---|
| JP | 2016209997 | A | | 12/2016 |
| JP | 2018069445 | A | | 5/2018 |
| JP | 2021120176 | A | * | 8/2021 |
| KR | 0175512 | B1 | | 2/1999 |
| KR | 200321249 | Y1 | | 7/2003 |
| KR | 100725516 | B1 | | 6/2007 |
| KR | 100833125 | B1 | | 5/2008 |
| KR | 20100116920 | A | | 11/2010 |
| KR | 20150010517 | A | | 1/2015 |
| KR | 20150099890 | A | | 9/2015 |
| WO | WO9909875 | A1 | | 3/1999 |
| WO | WO2004010253 | A2 | | 1/2004 |
| WO | WO2007090258 | A1 | | 8/2007 |
| WO | WO2008064952 | A1 | | 6/2008 |
| WO | WO2010085637 | A1 | | 7/2010 |
| WO | WO2011115121 | A1 | | 9/2011 |
| WO | WO2012027739 | A2 | | 3/2012 |
| WO | WO2012031925 | A1 | | 3/2012 |
| WO | WO2012061673 | A2 | | 5/2012 |
| WO | WO2015162193 | A1 | | 10/2015 |
| WO | WO2017075547 | A1 | | 5/2017 |
| WO | WO2017162600 | A1 | | 9/2017 |
| WO | WO2017171609 | A1 | | 10/2017 |
| WO | WO2018162233 | A1 | | 9/2018 |
| WO | WO2018177623 | A1 | | 10/2018 |
| WO | WO2018180896 | A1 | | 10/2018 |

OTHER PUBLICATIONS

Chiueh et al., "A Networked Robot System for Wireless Network Emulation," In Proceedings of the 1st International Conference on Robot Communication and Coordination, IEEE Press, 2007, 8 pages.

Domnitcheva, "Smart Vacuum Cleaner—An Autonomous Location-Aware Cleaning Device," In Proceedings of the 6th International Conference on Ubiquitous Computing, Tokyo, Japan, 2004, 2 pages.

Infinity Cutting Tools, "iVac Automated Dust Collection-Carbide Router Bits." <https://www.infinitytools.com/iVac-Automated-Dust-Collection/departments/1789/> webpage available as early as Mar. 8, 2013, 2 pages.

Instagram, Toolpig—Tools Carpentry Construction on Instagram, <https://www.instagram.com/p/BUchhjBgtmP/> published May 23, 2017, 1 page.

Instagram, Toolpig—Tools Carpentry Construction on Instagram, <https://www.instagram.com/p/BUR9YHFgr3N/?hl=en> published May 19, 2017, 1 page.

Makita, "Auto-Start Wireless System," <https://www.makitatools.com/aws>, 2018 [website accessed Jan. 25, 2018] 6 pages.

Makita, "Makita Tools 2017 New Product Launch Event," <http://www.coptool.com/makita-2017-new-products-event/> published May 22, 2017, 14 pages.

Mbright Tools, "iVAC Pro User Guide." <https://web.archive.org/web/20110415084930/http://www.ivacswitch.com/default.action?itemid=25> webpage available as early as Apr. 15, 2011, 66 pages.

Mbright Tools, "Overview of the iVAC Pro System." <https://web.archive.org/web/20110415084949/http://www.ivacswitch.com/default.action?itemid=35> webpage available as early as Apr. 15, 2011, 1 page.

Toolguyd, "New Makita 18V X2 Brushlees Miter Saw with Remote Dust Vac Trigger," <https://toolguyd.com/makita-18v-x2-brushless-miter-saw-xsl06-with-bluetooth-dust-collection-activation/> published May 24, 2017, 15 pages.

Youtube, Coptool—"Makita 18v LXT X2 Brushless 10" Miter Saw XSL06 & Corded LS1019L, <https://www.youtube.com/watch?v=-lqr26tB6Fg> published May 22, 2017, 9 pages.

Nakatani et al., "Communication system for central vacuum cleaner," National Technical Report, 1995, 41(1): p. 63-9 (English abstract only, 1 page).

International Search Report and Written Opinion for Application No. PPCT/US2022/016461 dated Jun. 2, 2022 (11 pages).

Diallo et al., "A Secure Authentication Scheme for Bluetooth Connection," Proceedings of the 2014 International Conference on Computer and Communication Engineering, 2014, pp. 60-63.

* cited by examiner

COMMUNICATION BETWEEN A WIRELESS DUST EXTRACTOR AND A POWER TOOL

RELATED APPLICATIONS

This application is a continuation of U.S. patent application Ser. No. 17/672,451, filed Feb. 15, 2022, now U.S. Pat. No. 12,273,937, which claims the benefit of U.S. Provisional Patent Application No. 63/149,796, filed Feb. 16, 2021, the entire content of each of which is hereby incorporated by reference.

SUMMARY

Power tools disclosed herein include a tool indicator, a wireless communication unit, and an electronic processor. The electronic processor is configured to search, via the wireless communication unit, for a connection advertisement broadcast from a dust extractor upon an initiation of a connection mode, establish, via the wireless communication unit, a wireless connection with the dust extractor when the connection advertisement is received, provide, via the wireless communication unit, a request for a connection identifier to the dust extractor, receive, via the wireless communication unit, a response from the dust extractor, the response including the connection identifier, and provide, via the tool indicator, an indication of a successful wireless connection.

In some embodiments, the power tools include a trigger. In some embodiments, the electronic processor is further configured to, after receiving the response from the dust extractor, provide a command, via the wireless communication unit, to the dust extractor based on an operation of the trigger. In some embodiments, the command includes a toggle command or a keep-alive command. In some embodiments, the command includes an indication of a current operation status of the power tool. In some embodiments, the power tools include a motor. In some embodiments, the current operation status of the power tool is that the motor is operating or that the motor has stopped operating.

In some embodiments, the electronic processor is further configured to, after receiving the connection identifier, provide, via the wireless communication unit, an acknowledgment that the connection identifier was received. In some embodiments, the electronic processor is further configured to, the electronic processor is further configured to receive, via the wireless communication unit, a media access control (MAC) address of the dust extractor from the dust extractor. In some embodiments, the MAC address is included in the connection advertisement or the response, received from the dust extractor.

In some embodiments, the electronic processor is further configured to authenticate the wireless connection based on an authentication scheme. In some embodiments, the authentication scheme includes a challenge-response pair, a common-key scheme, or a public-key scheme. In some embodiments, the power tools include a memory communicably coupled to the electronic processor. In some embodiments, the challenge-response pair is pre-programmed into the memory.

In some embodiments, the power tools include a tool connection button. In some embodiments, the connection mode is initiated when the tool connection button is pressed. In some embodiments, the power tools include a housing. In some embodiments, the tool connection button and the tool indicator are provided on the housing. In some embodiments, the wireless communication unit and the electronic processor are contained within the housing. In some embodiments, the tool connection button is provided digitally in a smartphone application executing on an external device connected via the wireless communication unit. In some embodiments, the electronic processor is further configured to provide, via the tool indicator, an indication that the power tool is in the connection mode upon the initiation of the connection mode.

In some embodiments, the search for the connection advertisement is conducted over a configured time period. In some embodiments, the wireless connection is established when the connection advertisement is received within the configured time period. In some embodiments, the electronic processor is further configured to provide, via the tool indicator, an indication of an unsuccessful connection when the connection advertisement is not received within the configured time period. In some embodiments, the configured time period is at least 30 seconds, one minute, two minutes, three minutes, four minutes, five minutes, and the like.

In some embodiments, the wireless connection is established using a lower level wireless communication protocol. In some embodiments, the lower level wireless communication protocol is a Bluetooth® protocol or a ZigBee® protocol. In some embodiments, connection identifier is used to establish future wireless connections between the power tool and the dust extractor.

Dust extractors disclosed herein include an extractor indicator, a wireless communication unit, and an electronic processor. The electronic processor is configured to broadcast, via the wireless communication unit, a connection advertisement upon an initiation of a connection mode, establish, via the wireless communication unit, a wireless connection with a power tool when the connection advertisement is received by the power tool, receive, via the wireless communication unit, a request for a connection identifier from the power tool, provide, via the wireless communication unit, a response to the power tool, the response including the connection identifier, and provide, via the extractor indicator, an indication of a successful wireless connection.

In some embodiments, the dust extractors include a motor. In some embodiments, the electronic processor is further configured to: after providing the response to the power tool, receive, from the power tool via the wireless communication unit, a command for an operation of the motor; and provide the command to the motor. In some embodiments, the motor is configured to perform the operation when the command is received. In some embodiments, the operation includes an activation or deactivation of the motor. In some embodiments, the command includes a period of time. In some embodiments, the motor is configured to perform the operation for the period of time. In some embodiments, the motor is configured to perform the operation until a command to cease the operation is received from the power tool via the electronic processor. In some embodiments, the command includes a toggle command or a keep-alive command. In some embodiments, the command includes an indication of a current operation status of the power tool. In some embodiments, the electronic processor is further configured to restrict the motor from receiving commands from other power tools while the motor is performing the operation. In some embodiments, the electronic processor is further configured to drop the wireless connection when a command is received before the response is provided to the power tool.

In some embodiments, the dust extractors include a memory communicably coupled to the electronic processor.

In some embodiments, the electronic processor is further configured to: before providing the response, generate the connection identifier when the connection identifier is not stored in the memory, and store the connection identifier to the memory. In some embodiments, the connection identifier is used to establish future wireless connections between the power tool and the dust extractor. In some embodiments, the connection identifier is a static identifier for the dust extractor. In some embodiments, the electronic processor is further configured to generate the static identifier upon an initial startup of the dust extractor.

In some embodiments, the electronic processor is further configured to, after providing the response, receive, via the wireless communication unit, an acknowledgment that the connection identifier was received by the power tool. In some embodiments, the indication of the successful wireless connection is providing via the extractor indicator after the acknowledgment is received from the power tool.

In some embodiments, the electronic processor is further configured to increment a connection count after the acknowledgment is received. In some embodiments, the electronic processor is further configured to provide, via the wireless communication unit, a MAC address of the dust extractor to the power tool. In some embodiments, the MAC address is included in the broadcast connection advertisement or the response provided to the power tool.

In some embodiments, the electronic processor is further configured to authenticate the wireless connection based on an authentication scheme. In some embodiments, the authentication scheme includes a challenge-response pair, a common-key scheme, or a public-key scheme.

In some embodiments, the dust extractors include a memory communicably coupled to the electronic processor. In some embodiments, the challenge-response pair is preprogrammed into the memory.

In some embodiments, the dust extractors include a tool connection button. In some embodiments, the connection mode is initiated when the tool connection button is pressed. In some embodiments, the dust extractors include a housing. In some embodiments, the tool connection button and the extractor indicator are provided on the housing. In some embodiments, the wireless communication unit and the electronic processor are contained within the housing. In some embodiments, the tool connection button is provided digitally in a smartphone application executing on an external device connected via the wireless communication unit.

In some embodiments, the electronic processor is further configured to provide, via the extractor indicator, an indication that the power tool is in the connection mode upon the initiation of the connection mode. In some embodiments, the electronic processor is further configured to increment a connection count after providing the response, and provide, via the extractor indicator, an indication of the connection count.

In some embodiments, the wireless connection is established using a lower level wireless communication protocol. In some embodiments, the lower level wireless communication protocol is a Bluetooth® protocol or a ZigBee® protocol.

Systems for establishing a wireless connection using a connection identifier described herein includes a dust extractor and a power tool. The dust extractor includes an extractor indicator, an extractor wireless communication unit, and an extractor electronic processor. The power tool includes a power tool comprising a tool indicator, a tool wireless communication unit, and a tool electronic processor. The extractor electronic processor is configured to broadcast, via the extractor wireless communication unit, a connection advertisement upon an initiation of an extractor connection mode, establish, via the extractor wireless communication unit, the wireless connection with a power tool when the connection advertisement is received by the power tool, receive, via the extractor wireless communication unit, a request for the connection identifier from the power tool, provide, via the extractor wireless communication unit, a response to the power tool, the response including the connection identifier, and provide, via the extractor indicator, a first indication of a successful wireless connection. The tool electronic processor is configured to search, via the tool wireless communication unit, for the connection advertisement broadcast from the dust extractor upon an initiation of a tool connection mode, establish, via the tool wireless communication unit, the wireless connection with the dust extractor when the connection advertisement is received, provide, via the tool wireless communication unit, the request for the connection identifier to the dust extractor, receive, via the tool wireless communication unit, the response from the dust extractor, and provide, via the tool indicator, a second indication of the successful wireless connection.

Embodiments of the dust extractor and a power tool include the embodiments of the aspects described above.

Methods for connecting a wireless dust extractor with a power tool described herein include requesting, with a tool electronic processor of the power tool, a dust extractor connection identifier from the wireless dust extractor, providing, using the vacuum electronic processor of the dust extractor, the dust extractor connection identifier to the power tool, the dust extractor connection identifier being a static identifier used for connecting the wireless dust extractor with the power tool, establishing a wireless connection between the power tool and the wireless dust extractor using the dust extractor connection identifier, sending, using the tool electronic processor, commands to the wireless dust extractor for operation of the dust extractor, controlling, using the vacuum electronic processor, a vacuum motor of the wireless dust extractor based on the commands to operate the vacuum motor concurrently with the tool motor.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of “including,” “comprising,” or “having” and variations thereof are meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about two to about four" also discloses the range "from two to four". The relative terminology may refer to plus or minus a percentage (e.g., one percent, five percent, ten percent, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
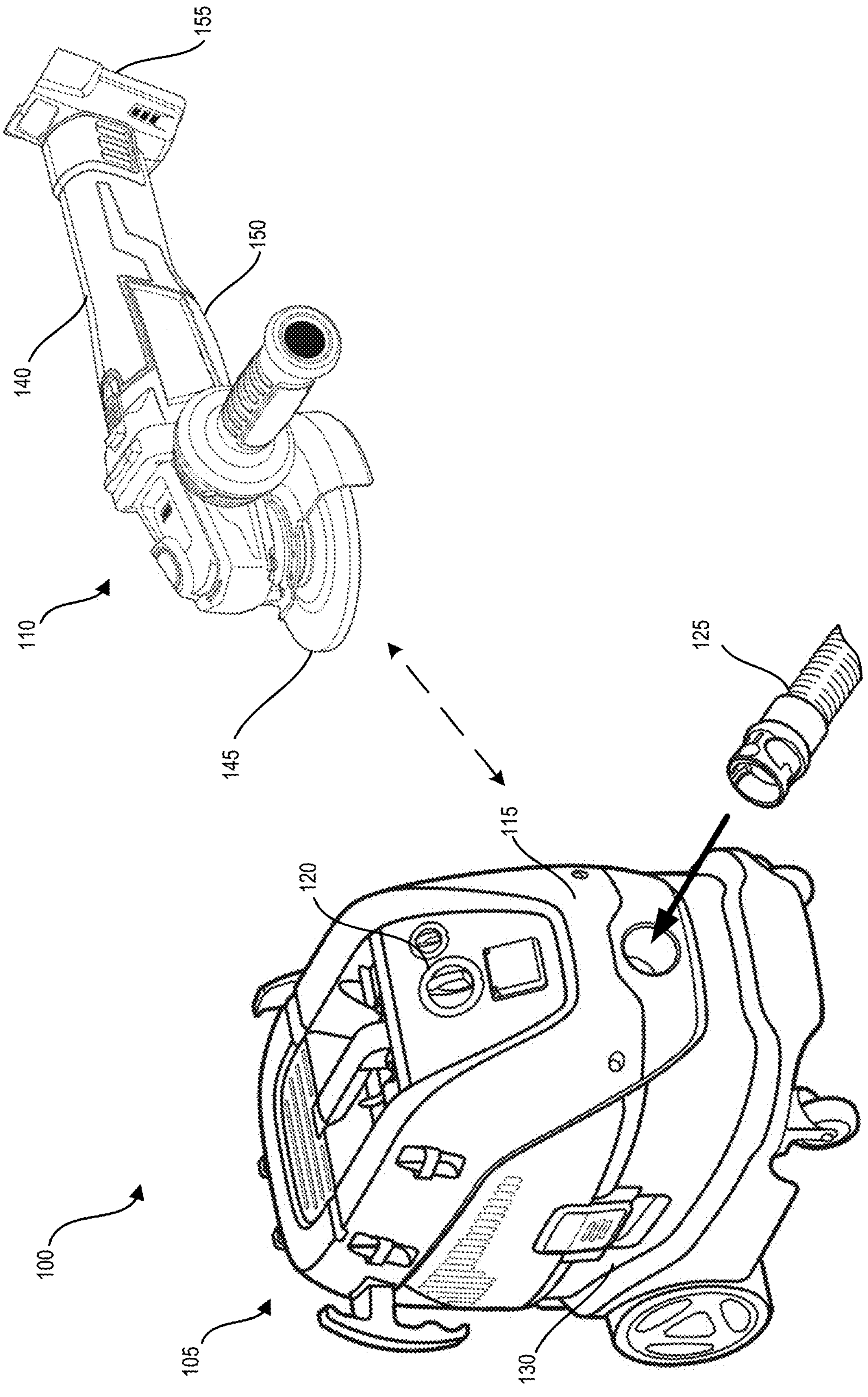
FIG. 1 illustrates a wireless communication system between a wireless dust extractor and a power tool in accordance with some embodiments.

FIG. 1 illustrates a wireless communication system 100 including a wireless dust extractor 105 and a power tool 110. The wireless dust extractor 105 includes a housing 115, a power switch 120 for turning on and off the wireless dust extractor 105, a suction hose 125, and a collection container 130. In some embodiments, the wireless dust extractor 105 is AC powered vacuum including a power cord for receiving AC power from a wall outlet. In other embodiments, the wireless dust extractor 105 is a cordless vacuum including a power tool battery pack as the power source. The power tool 110 includes a housing 140, an output unit 145, a trigger 150, and a battery pack interface 155. The battery pack interface 155 is configured to receive and electrically coupled to a power tool battery pack. In some embodiments, the power tool 110 is an AC tool and includes a power cord to receive AC power from a wall outlet.

Figure 2:
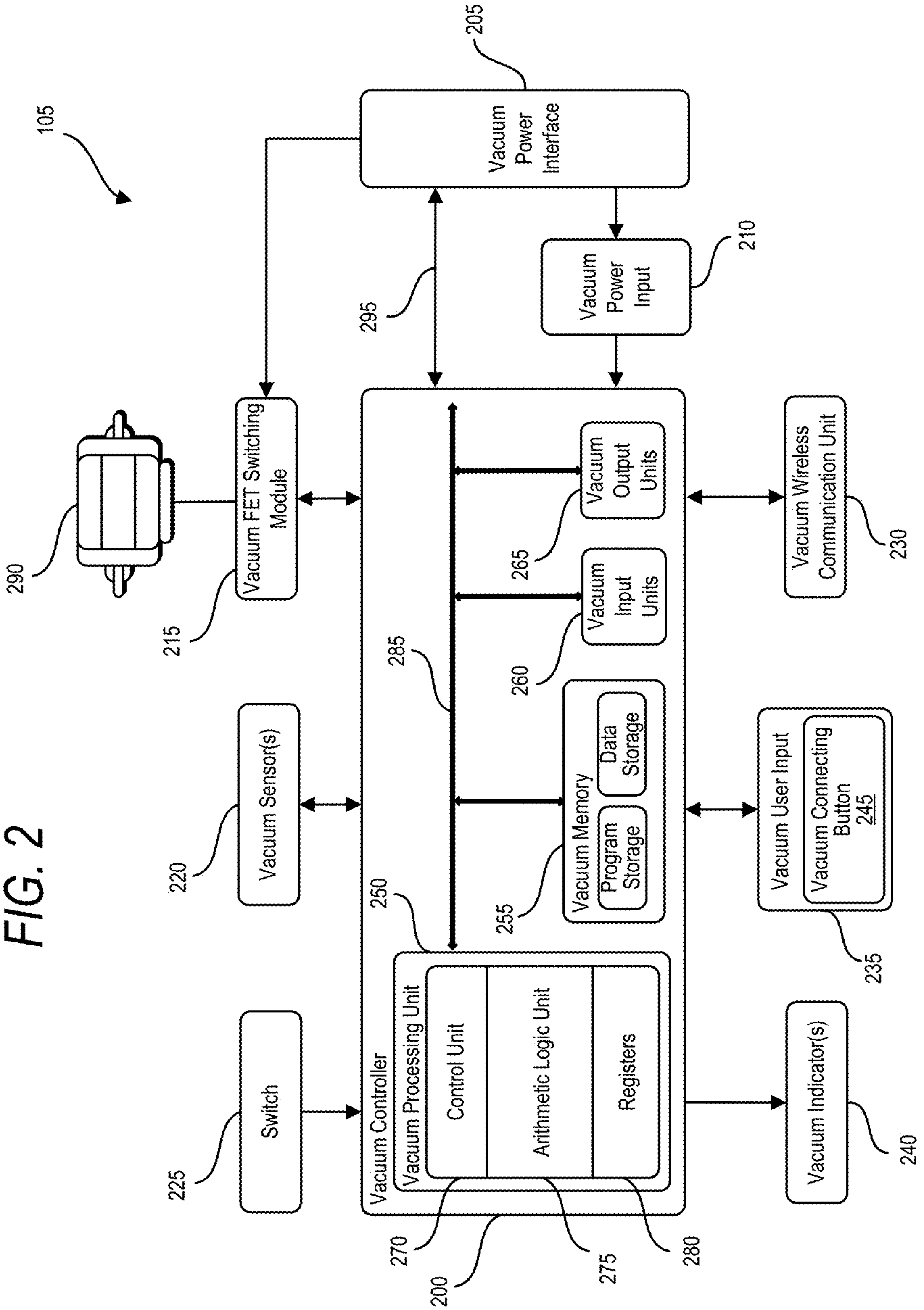
FIG. 2 is a block diagram of the wireless dust extractor of FIG. 1 in accordance with some embodiments.

FIG. 2 illustrates a block diagram of the wireless dust extractor 105. In the example illustrated, the wireless dust extractor 105 includes a vacuum controller (for example, a vacuum electronic processor 200) electrically and/or communicatively connected to a variety of modules or components of the wireless dust extractor 105. For example, the illustrated vacuum electronic processor 200 is connected to a vacuum power interface 205, a vacuum power input module 210, a vacuum FET switching module 215, one or more vacuum sensors 220, a switch 225 (connected to the power switch 120), a vacuum wireless communication unit 230, a vacuum user input module 235, and one or more vacuum or extractor indicators 240. In some embodiments, the switch 225 is combined and integral with the vacuum electronic processor 200 within a housing within the wireless dust extractor 105. The vacuum electronic processor 200 includes combinations of hardware and software that are operable to, among other things, control operation of the wireless dust extractor 105, activate one or more vacuum indicators 240 (e.g., an LED), monitor the operation of the wireless dust extractor 105, communicate with an associated external device (e.g., the power tool 110), and the like.

In some embodiments, the vacuum electronic processor 200 includes a plurality of electrical and electronic components that provide power, operational control, and protection to the components and modules within the vacuum electronic processor 200 and/or the wireless dust extractor 105. For example, the vacuum electronic processor 200 includes, among other things, a vacuum processing unit 250 (e.g., a microprocessor, a microcontroller, an electronic processor, or another suitable programmable device), a vacuum memory 255, vacuum input units 260, and vacuum output units 265. The vacuum processing unit 250 includes, among other things, a control unit 270, an arithmetic logic unit ("ALU") 275, and a plurality of registers 280 (shows as a group of registers in FIG. 2), and is implemented using a known computer architecture, such as a modified Harvard architecture, a von Neumann architecture, etc. The vacuum processing unit 250, the vacuum memory 255, the vacuum input units 260, and the vacuum output units 265 as well as the various modules connected to the vacuum electronic processor 200 are connected by one or more control and/or data buses (e.g., a vacuum common bus 285). The control and/or data buses are shown generally in FIG. 2 for illustrative purposes.

The vacuum memory 255 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The vacuum processing unit 250 is connected to the vacuum memory 255 and executes software instructions that are capable of being stored in a RAM of the vacuum memory 255 (e.g., during execution), a ROM of the vacuum memory 255 (e.g., on a generally permanent basis), or another non-transitory computer readable medium such as another memory or a disc. Software included in the implementation of the wireless dust extractor 105 can be stored in the vacuum memory 255 of the vacuum electronic processor 200. The software includes, for example, firmware, one or more applications, program data, filters, rules, one or more program modules, and other executable instructions. The vacuum electronic processor 200 is configured to retrieve from memory and execute, among other things, instructions related to the control processes and methods described herein. In other constructions, the vacuum electronic processor 200 includes additional, fewer, or different components.

In some embodiments, the vacuum power interface 205 includes a combination of mechanical and electrical components configured to and operable for interfacing with a battery pack. For example, power provided by the battery pack to the wireless dust extractor 105, is provided through the vacuum power interface 205 to a vacuum power input module 210. The vacuum power interface 205 also includes, for example, a communication line 295 for providing a communication line or link between the vacuum electronic processor 200 and the battery pack. In other embodiments, the vacuum power interface 205 includes an interface to receive a power cord. For example, power provided by the power cord to the wireless dust extractor 105, is provided through the vacuum power interface 205 to the vacuum power input module 210. The vacuum power input module 210 includes combinations of active and passive components to regulate or control the power received from the battery pack and/or the power cord prior to power being provided to the vacuum electronic processor 200. The vacuum power interface 205 also supplies power to the vacuum FET switching module 215 to be switched by switching FETs in the vacuum FET switching module 215 to selectively provide power to a vacuum motor 290.

The vacuum motor 290 is, for example, a brushless direct current (BLDC) motor. The vacuum motor 290 is operated to provide a suction force, for example, through the suction hose 125. The vacuum motor 290 is turned on and off by the user actuating the power switch 120. When the user actuates the power switch 120, the vacuum electronic processor 200 controls the drive of the vacuum motor 290. In some embodiments, the vacuum motor 290 is controlled based on signals received from the vacuum wireless communication unit 230 as further discussed below. The vacuum FET switching module 215 includes an H-bridge or an inverter bridge used for controlling the vacuum motor 290. The vacuum electronic processor 200 provides PWM signals to the H-bridge or the inverter bridge to control the vacuum motor 290. In other embodiments, the vacuum motor 290 is an AC motor controlled by providing AC power to the vacuum motor 290. The vacuum electronic processor 200 fires a triac to control the vacuum motor 290. In these embodiments, the vacuum FET switching module 215 may be replaced with a triac.

The one or more vacuum sensors 220 include, among other things, one or more temperature sensors, one or more Hall Effect sensors, etc. For example, the speed of the vacuum motor 290 can be determined using a plurality of Hall Effect sensors to sense the rotational position of the rotor of the vacuum motor 290. In some embodiments, voltage or current sensors may be used to measure a rotational position of the rotor of the vacuum motor 290. The switch 225 is connected to the power switch 120 for controlling whether the power provided to the vacuum motor 290.

The power switch 120 and the switch 225 may include a three position switch. The power switch 120 can be actuated between an on position, an off position, and a remote operation position. When the power switch 120 is in the on position, the vacuum electronic processor 200 turns on the vacuum motor 290 to provide a suction force through the suction hose 125. When the power switch 120 is in the off position, the vacuum electronic processor 200 turns off the vacuum motor 290. When the power switch 120 is in the remote operation position, the vacuum motor 290 is controlled based on signals received from the vacuum wireless communication unit 230, as further described below. In some embodiments, the power switch 120 is a toggle on/off switch (e.g., a push button). In these embodiments, the vacuum motor 290 is controlled based on signals received from the vacuum wireless communication unit 230 when the power switch 120 is on. In some embodiments, an additional switch may be provided to control the motor 290 when the power switch 120 is in the on position. When the power switch 120 is in the off position, the wireless dust extractor 105 is turned off.

The vacuum wireless communication unit 230 is operably coupled to the vacuum electronic processor 200 to, for example, allow wireless communication with an external device (e.g., the power tool 110, a user's smartphone, a connected display or control unit, and the like). The vacuum wireless communication unit 230 allows the vacuum electronic processor 200 to receive inputs from the external device and provide outputs for display on the external device. The vacuum wireless communication unit 230 provides operation signal to the vacuum electronic processor 200 based on input signals received from the power tool 110. In some embodiments, the power switch 120, the vacuum indicators 240, and the vacuum user input module 235 may be implemented as inputs and/or outputs on the external device. The inputs from the external device are received through the vacuum wireless communication unit 230 and the outputs to the external device are provided through the vacuum wireless communication unit 230.

The vacuum user input module 235 is operably coupled to the vacuum electronic processor 200 to, for example, select a connection mode of the wireless dust extractor 105 (e.g., using a vacuum connecting button 245), a speed setting for the wireless dust extractor 105 (e.g., using speed switches), etc. In some embodiments, the vacuum user input module 235 includes a combination of digital and analog input or output devices required to achieve a desired level of operation for the wireless dust extractor 105, such as one or more knobs, one or more dials, one or more switches, one or more buttons, etc. The vacuum indicators 240 include, for example, one or more light-emitting diodes ("LED"). The vacuum indicators 240 are configured to indicate measured electrical characteristics of the wireless dust extractor 105, the status of the wireless dust extractor 105, and/or the like. For example, the vacuum indicators 240 provide an indication that the wireless dust extractor 105 is in a connection mode, connecting with the power tool 110 is complete, connecting with the power tool 110 failed, and/or the like. In some embodiments, the connection mode is a pairing mode (e.g., a Bluetooth pairing mode).

Figure 3:
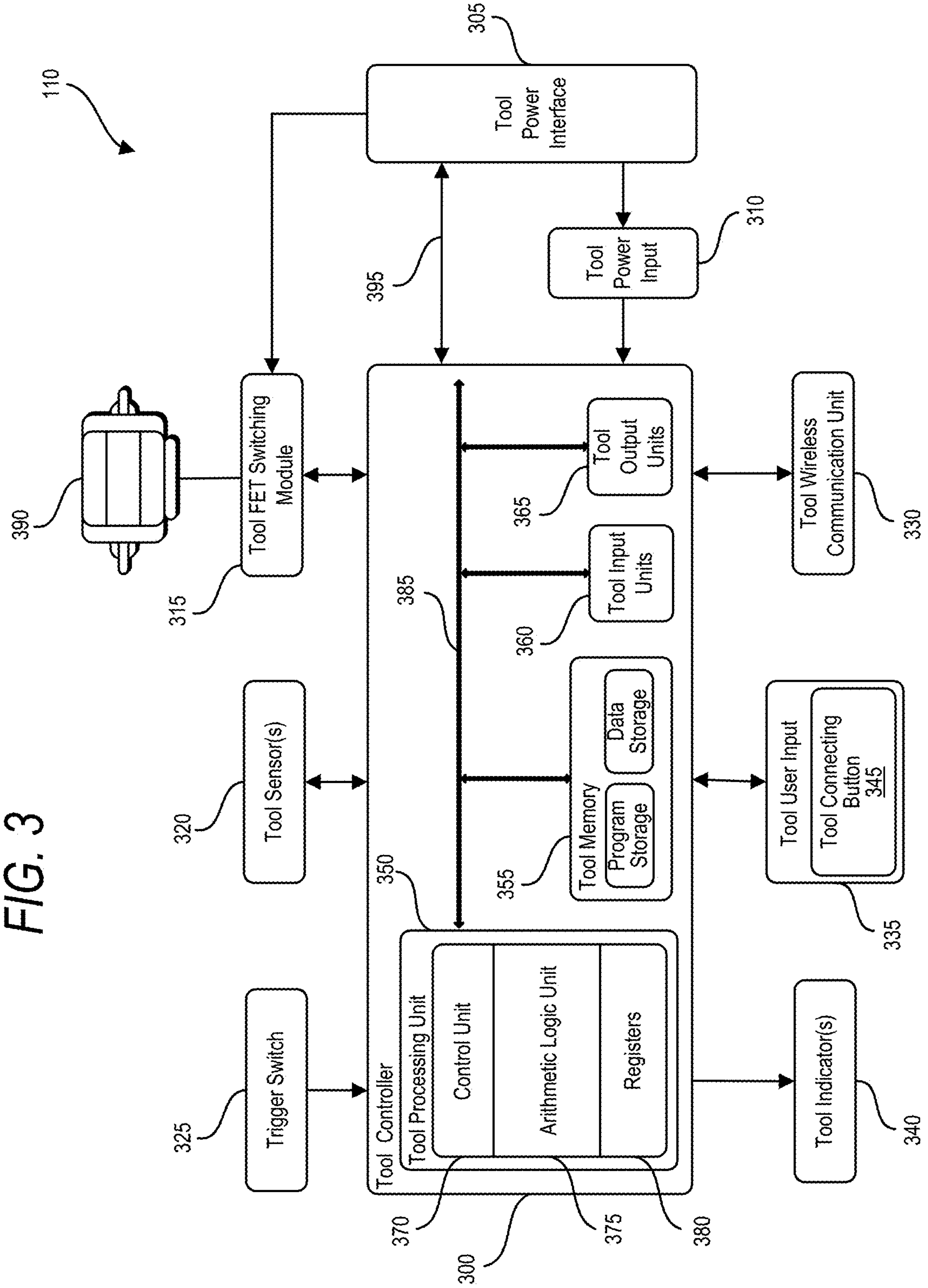
FIG. 3 is a block diagram of the power tool of FIG. 1 in accordance with some embodiments.

FIG. 3 illustrates a block diagram of the power tool 110. In the example illustrated, the power tool 110 includes a tool controller (for example, a tool electronic processor 300) electrically and/or communicatively connected to a variety of modules or components of the power tool 110. For example, the illustrated tool electronic processor 300 is connected to a tool power interface 305, a tool power input module 310, a tool FET switching module 315, one or more tool sensors 320, a trigger switch 325 (connected to the trigger 150), a tool wireless communication unit 330, a tool user input module 335, and one or more tool indicators 340. In some embodiments, the trigger switch 325 is combined and integral with the tool electronic processor 300 within a housing within the power tool 110. The tool electronic processor 300 includes combinations of hardware and software that are operable to, among other things, control operation of the power tool 110, activate one or more tool indicators 340 (e.g., an LED), monitor the operation of the power tool 110, communicate with an associated external device (e.g., the wireless dust extractor 105, a smartphone, etc.), and the like.

The tool electronic processor 300 is implemented similar to the vacuum electronic processor 200 as described above. For example, the tool electronic processor 300 includes, among other things, a tool processing unit 350 (e.g., a microprocessor, a microcontroller, an electronic processor, or another suitable programmable device), a tool memory 355, tool input units 360, and tool output units 365. The tool processing unit 350 includes, among other things, a control unit 370, an arithmetic logic unit ("ALU") 375, and a plurality of registers 380 (shows as a group of registers in FIG. 3), and is implemented using a known computer architecture, such as a modified Harvard architecture, a von Neumann architecture, etc. The tool processing unit 350, the tool memory 355, the tool input units 360, and the tool output units 365 as well as the various modules connected to the tool electronic processor 300 are connected by one or more control and/or data buses (e.g., a tool common bus 385). The control and/or data buses are shown generally in FIG. 3 for illustrative purposes.

The tool memory 355 is a non-transitory computer readable medium and is implemented similar to the vacuum memory 255 as described above. The tool processing unit 350 is connected to the tool memory 355 and executes software instructions that are capable of being stored in a RAM of the tool memory 355 (e.g., during execution), a ROM of the tool memory 355 (e.g., on a generally permanent basis), or another non-transitory computer readable medium such as another memory or a disc. Software included in the implementation of the power tool 110 can be stored in the tool memory 355 of the tool electronic processor 300. The software includes, for example, firmware, one or more applications, program data, filters, rules, one or more program modules, and other executable instructions. The tool electronic processor 300 is configured to retrieve from memory and execute, among other things, instructions related to the control processes and methods described herein. In other constructions, the tool electronic processor 300 includes additional, fewer, or different components.

In some embodiments, the tool power interface 305 includes a combination of mechanical and electrical components configured to and operable for interfacing with a battery pack. For example, power provided by the battery pack to the power tool 110, is provided through the tool power interface 305 to a tool power input module 310. The tool power interface 305 also includes, for example, a communication line 395 for providing a communication line or link between the tool electronic processor 300 and the battery pack. In other embodiments, the tool power interface 305 includes an interface to receive a power cord. For example, power provided by the power cord to the power tool 110, is provided through the tool power interface 305 to the tool power input module 310. The tool power input module 310 includes combinations of active and passive components to regulate or control the power received from the battery pack and/or power cord prior to power being provided to the tool electronic processor 300. The tool power interface 305 also supplies power to the tool FET switching module 315 to be switched by switching FETs in the tool FET switching module 315 to selectively provide power to a tool motor 390.

The tool motor 390 is, for example, a brushless direct current (BLDC) motor. The tool motor 390 is operated to operate an output (e.g., a saw blade) on a workpiece. The tool motor 390 is controlled by the user using the trigger 150. When the user actuates the trigger 150, the tool electronic processor 300 controls the drive of the tool motor 390. The tool FET switching module 315 includes an H-bridge or an inverter bridge used for controlling the tool motor 390. The tool electronic processor 300 provides PWM signals to the H-bridge or the inverter bridge to control the speed and direction of the tool motor 390 based on signals received from the trigger 150 and rotor position sensors/estimators.

The one or more tool sensors 320 include, among other things, one or more temperature sensors, one or more Hall Effect sensors, etc. For example, the speed of the tool motor 390 can be determined using a plurality of Hall Effect sensors to sense the rotational position of the rotor of the tool motor 390. In some embodiments, voltage or current sensors may be used to measure a rotational position of the rotor of the tool motor 390. The trigger switch 325 is connected to the trigger 150 for controlling the power provided to the tool motor 390 through the switching FETs. In some embodiments, the amount of trigger pull detected by the trigger switch 325 is related to or corresponds to a desired speed of rotation of the tool motor 390. In other embodiments, the amount of trigger pull detected by the trigger switch 325 is related to or corresponds to a desired torque.

The tool wireless communication unit 330 is operably coupled to the tool electronic processor 300 to, for example, allow wireless communication with an external device (e.g., the wireless dust extractor 105, a user's smartphone, a connected display or control unit, and the like). The tool wireless communication unit 330 allows the tool electronic processor 300 to receive inputs from the external device and provide outputs for display on the external device. The tool wireless communication unit 330 communicates with the vacuum wireless communication unit 230 to control operation of the wireless dust extractor 105 based on the operation of the power tool 110. In some embodiments, the trigger 150, the tool indicators 340, and the tool user input module 335 may be implemented as inputs and/or outputs on the external device. The inputs from the external device are received through the tool wireless communication unit 330 and the outputs to the external device are provided through the tool wireless communication unit 330.

The tool user input module 335 is operably coupled to the tool electronic processor 300 to, for example, select a connection mode of the power tool 110 (using a tool connecting button 345), select a forward mode of operation or a reverse mode of operation, a torque and/or speed setting for the power tool 110 (e.g., using the torque and/or speed switches), etc. In some embodiments, the tool user input module 335 includes a combination of digital and analog input or output devices required to achieve a desired level of operation for the power tool 110, such as one or more knobs, one or more dials, one or more switches, one or more buttons, etc. The tool indicators 340 include, for example, one or more light-emitting diodes ("LED"). The tool indicators 340 are configured to indicate measured electrical characteristics of the power tool 110, the status of the power tool 110, etc. For example, the tool indicators 340 provide an indication that the power tool 110 is in a connection mode, connecting with the wireless dust extractor 105 is complete, connecting with the wireless dust extractor 105 failed, and/or the like.

Figure 4A:
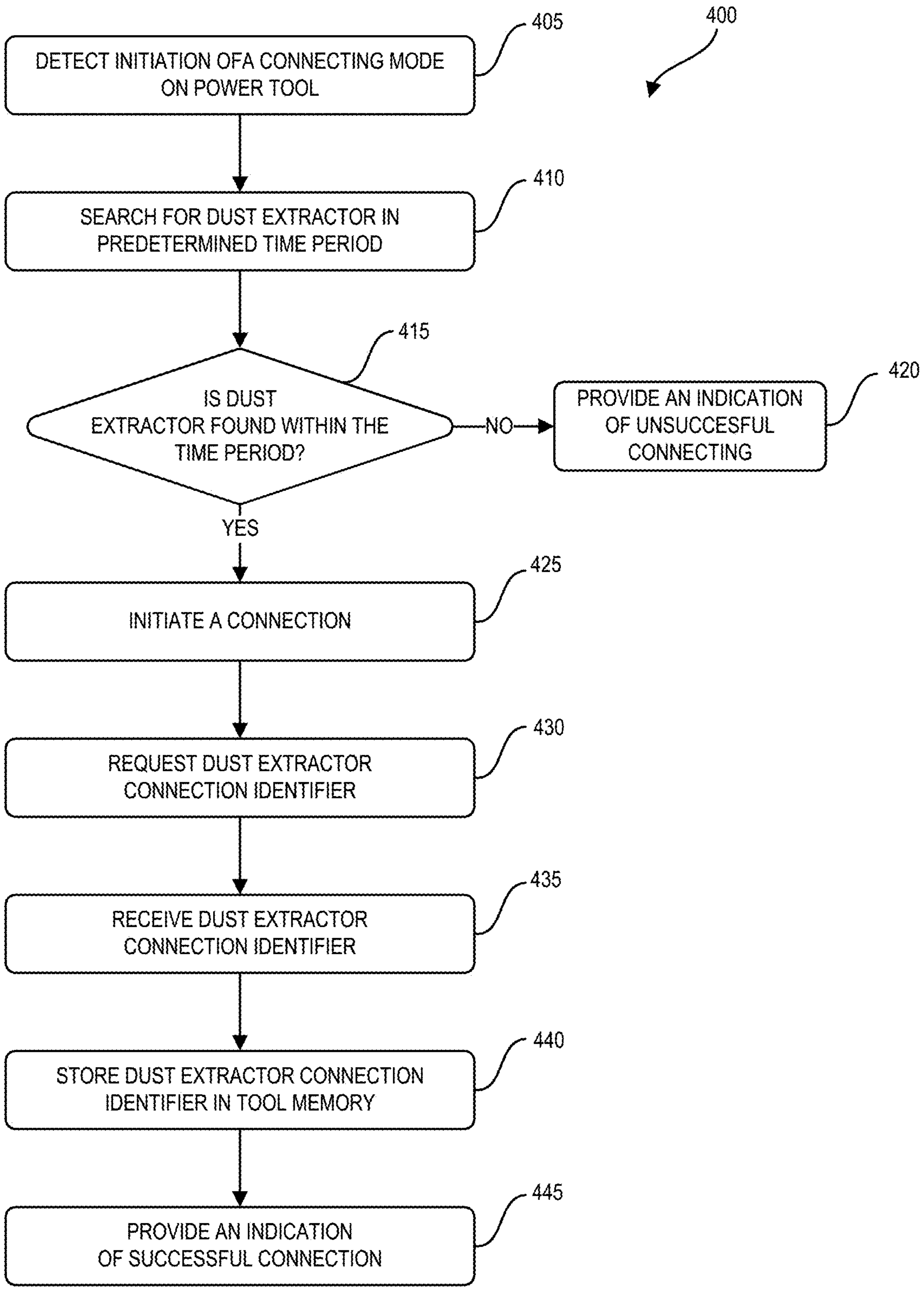
FIG. 4A is a flowchart of a method for connecting the power tool with the wireless dust extractor of FIG. 1 in accordance with some embodiments.

FIG. 4A is a flowchart of an example method 400 for connecting the power tool 110 with the wireless dust extractor 105. In the example illustrated, the method 400 includes detecting, using the tool electronic processor 300, initiation of a connection mode on the power tool 110 (at block 405). Connecting is initiated by the user pressing the tool connecting button 345. The tool connecting button 345 may be provided on the housing 140 of the power tool 110. In some embodiments, the tool connecting button 345 may be provided digitally in a connected smartphone application on an external device associated with the power tool 110. When the tool connecting button 345 is actuated or selected (e.g., pressed), the power tool 110 enters a connection mode in which the power tool 110 may be connected with other devices for future connected operations.

The method 400 includes searching, using the tool electronic processor 300, for the wireless dust extractor 105 within a predetermined connecting time period (at block 410). The predetermined connecting time period may be set to, for example, 30 seconds, 1 minute, or the like. When in the connection mode, the power tool 110 looks for connecting advertisements from the wireless dust extractor 105. The method 400 includes determining, using the tool electronic processor 300, whether the wireless dust extractor 105 is found within the predetermined connecting time period (at block 415). The tool electronic processor 300 determines that the wireless dust extractor 105 is found when the tool electronic processor 300 detects the connecting advertisement from the wireless dust extractor 105. When the wireless dust extractor 105 is not found within the predetermined connecting time period, the method 400 includes providing, using the tool indicators 340, an indication of unsuccessful connecting (at block 420). For example, the tool electronic processor 300 controls a connecting indicator to turn red.

When the wireless dust extractor 105 is found within the predetermined connecting time period, the method 400 includes initiating, using the tool wireless communication unit 330, a connection (at block 425). The connection may be initiated using a lower level wireless communication protocol. For example, the connection may be initiated using a Bluetooth® or ZigBee® protocol depending on the kind of wireless communication units 230, 330, used for communication between the wireless dust extractor 105 and the power tool 110.

The method 400 also includes requesting, using the tool electronic processor 300, a connection identifier from the wireless dust extractor 105 (at block 430). The tool electronic processor 300 sends a request for a connection identifier to the wireless dust extractor 105 through the tool wireless communication unit 330. The connection identifier is an identifier that is used for future connections between the power tool 110 and the wireless dust extractor 105. The method 400 includes receiving, via the tool wireless communication unit 330, the connection identifier (at block 435) and storing the connection identifier in the tool memory 355 (at block 440). In some embodiments, a MAC address of the wireless dust extractor 105 may also be received along with the connection identifier or along with the initial connection advertisement provided by the wireless dust extractor 105. The MAC address is also stored in the tool memory 355 along with the connection identifier.

Once the connection identifier is stored in the tool memory 355, the method 400 includes providing, using the tool indicators 340, an indication of successful wireless connection (at block 445). For example, the tool electronic processor 300 controls a connection indicator to turn green. Once wireless connection is successful, the power tool 110 and the wireless dust extractor 105 are ready for automatic concurrent operation, as further described below.

Figure 4B:
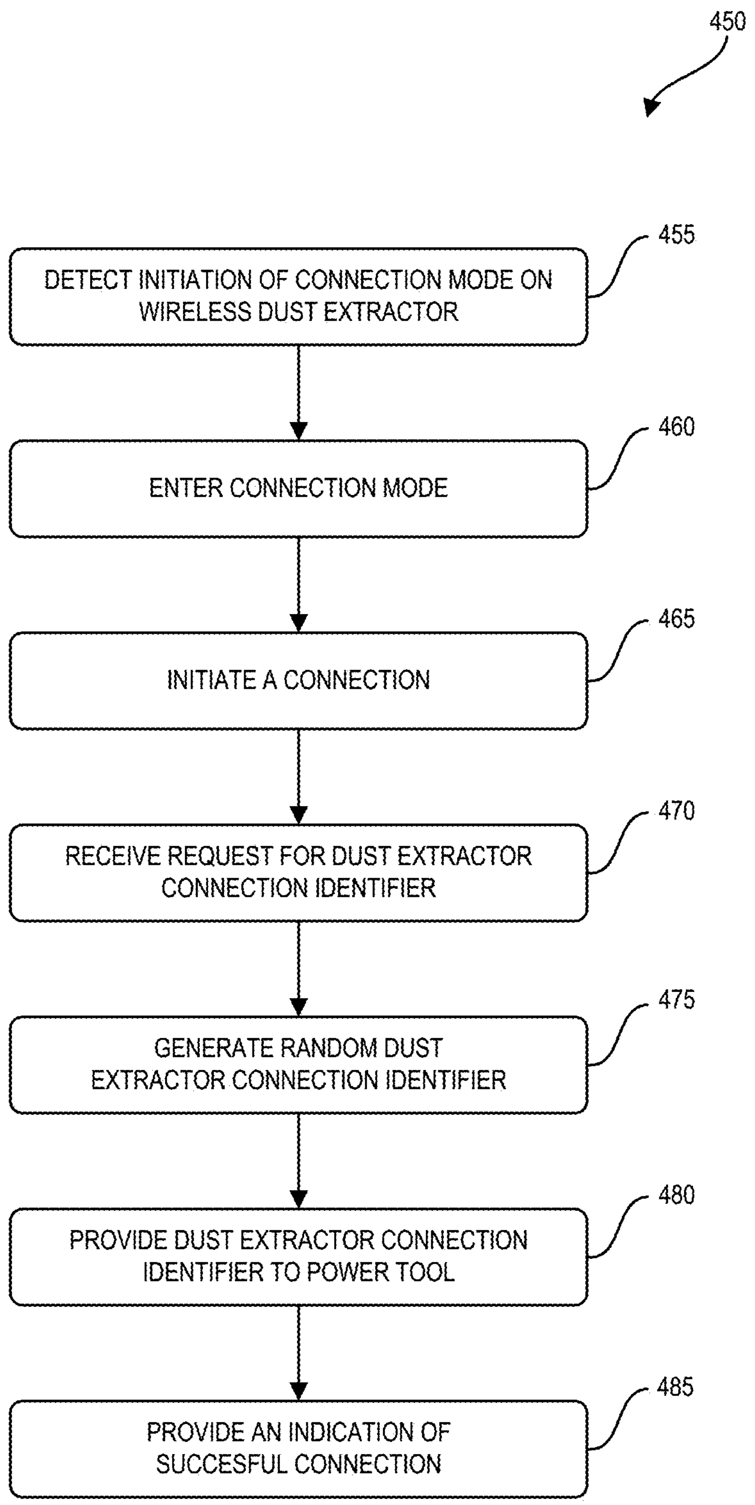
FIG. 4B is a flowchart of a method for connecting the wireless dust extractor with the power tool of FIG. 1 in accordance with some embodiments.

FIG. 4B is a flowchart of an example method 450 for connecting the wireless dust extractor 105 with the power tool 110. In the example illustrated, the method 450 includes detecting, using the vacuum electronic processor 200, initiation of connecting on the wireless dust extractor 105 (at block 455). Connecting is initiated by the user pressing the vacuum connecting button 245. The vacuum connecting button 245 may be provided on the housing 115 of the wireless dust extractor 105. In some embodiments, the vacuum connecting button 245 may be provided digitally in a connected smartphone application on an external device associated with the wireless dust extractor 105. When the vacuum connecting button 245 is actuated or selected (e.g., pressed), the wireless dust extractor 105 enters a connection mode in which the wireless dust extractor 105 may be connected with other devices for future connected operations.

When connecting is initiated, the method 450 includes entering, using the vacuum electronic processor 200, the connection mode on the wireless dust extractor 105 (at block 460). When in the connection mode, the wireless dust extractor 105 broadcasts connection advertisements to nearby devices. The connection advertisements include, for example, a MAC address of the wireless dust extractor 105. The method 450 also includes initiating, using the vacuum wireless communication unit 230, a connection with the power tool 110 when the wireless dust extractor 105 is found by the power tool 110 (at block 465). The connection may be initiated using a lower level wireless communication protocol. For example, the connecting may be initiated using a Bluetooth® or ZigBee® protocol depending on the kind of wireless communication units 230, 330, used for communication between the wireless dust extractor 105 and the power tool 110.

The method 450 includes receiving, via the vacuum wireless communication unit 230, a request for the connection identifier (at block 470) and generating, using the vacuum electronic processor 200, a random connection identifier (at block 475). The wireless dust extractor 105 uses a static identifier for connecting with different power tool 110. Specifically, the same static identifier is used by the wireless dust extractor 105 to connect with any number of power tools 110. The vacuum electronic processor 200 may only generate the static identifier once. The static identifier is then used as the connection identifier.

In some embodiments, the wireless dust extractor 105 may use dynamic connection identifiers for connecting with power tools 110. For example, the wireless dust extractor 105 may generate a separate connection identifier for each connecting request received from a previously unconnected power tool 110. The power tool 110 and the wireless dust extractor 105 then communicate using the unique connection identifier generated for the power tool 110 (rather than only being communicatively connected to one another, linked with one another, associated with one another, etc.).

The method 450 includes providing, via the vacuum wireless communication unit 230, the connection identifier to the power tool 110 (at block 480). In some embodiments, the MAC address of the wireless dust extractor 105 is also sent to the power tool 110 with the connection identifier. As discussed above, the dust extractor identifier is used for future connections between the wireless dust extractor 105 and the power tool 110. The method 450 further includes providing, using the vacuum indicators 240, an indication of successful wireless connection (at block 485). For example, the vacuum electronic processor 200 controls a connecting indicator to turn green. In some embodiments, the indication of successful wireless connection is providing in response to receiving an acknowledgment from the power tool 110 that the connection identifier is stored in the tool memory 355. Once a wireless connection is successful, the power tool 110 and the wireless dust extractor 105 are ready for automatic concurrent operation as further described below.

Figure 5:
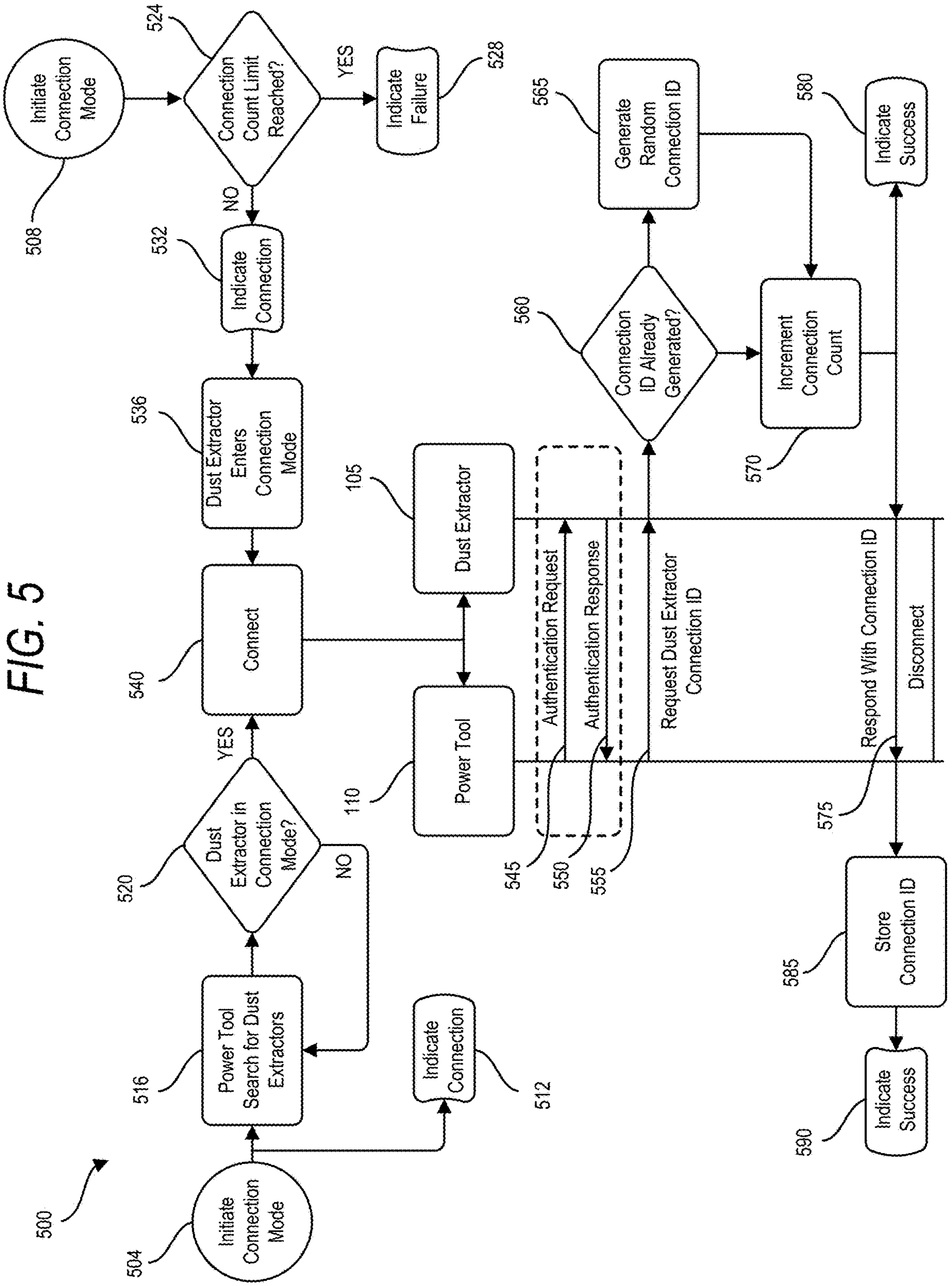
FIG. 5 is a timing flow diagram of a connecting operation between the wireless dust extractor and the power tool of FIG. 1 in accordance with some embodiments.

FIG. 5 is an example timing flow diagram 500 for connecting the wireless dust extractor 105 and the power tool 110 as provided in methods 400 and 450. The connecting begins when a user initiates connecting on the power tool 110 (at block 504) and on the wireless dust extractor 105 (at block 508). When connecting is initiated on the power tool 110, the power tool 110 provides, using the tool indicators 340, an indication that the power tool 110 is in the connection mode (at block 512). For example, the tool electronic processor 300 controls the connection LED on the power tool 110 to blink green. The power tool 110 then searches for wireless dust extractors 105 that are in connection mode for a predetermined time period (at block 516). In the example illustrated, the predetermined time period is 30 seconds. The power tool 110 continues to search for wireless dust extractors 105 that are in connection mode until the predetermined time period expires or until a wireless dust extractor 105 in connection mode is found (at block 520).

On the wireless dust extractor 105 side, the wireless dust extractor 105 may optionally enforce a connection count. Specifically, the wireless dust extractor 105 may limit the number of power tools 110 that can be connected with the wireless dust extractor 105. When connecting is initiated, the vacuum electronic processor 200 determines whether a connection count limit is reached (at block 524). In some embodiments, the wireless dust extractor 105 may optionally store connection identifiers with each power tool 110. In these embodiments, the vacuum electronic processor 200 may enforce a first in first out (FIFO) scheme when a connection count limit is reached. Specifically, the vacuum electronic processor 200 erases the oldest connection with a power tool 110 to make room for the latest connection request from a different power tool 110.

When the connection count limit is reached, the vacuum electronic processor 200 indicates, using the vacuum indicators 240, that connection has failed (at block 528). When the connection count limit is not reached, the vacuum electronic processor 200 indicates, using the vacuum indicators 240, that the wireless dust extractor 105 is in the connection mode (at block 532). For example, the vacuum electronic processor 200 controls the connection LED on the wireless dust extractor 105 to blink green. The vacuum electronic processor 200 then places the wireless dust extractor 105 in the connection mode for the predetermined time period (at block 536). In some embodiments, the time period for the power tool 110 may be different from the time period for the wireless dust extractor 105. When in the connection mode, the wireless dust extractor 105 broadcasts a connection advertisement to nearby devices.

When the wireless dust extractor 105 in the connection mode is found by the power tool 110, a connection is initiated (at block 540). As discussed above, the connection may be performed in a lower level wireless communication protocol. During the connecting process, the power tool 110 and the wireless dust extractor 105 may perform an authentication process. The authentication process includes the tool electronic processor 300 sending an authentication request 545 to the wireless dust extractor 105. In response to receiving the authentication request 545, the vacuum electronic processor 200 sends an authentication response 550 to the power tool 110. The authentication request 545 and the authentication response 550 are, for example, a challenge-response pair pre-programmed into the power tool 110 and the wireless dust extractor 105 for authentication. Authentication is complete when the tool electronic processor 300 verifies that the authentication response 550 matches a response stored in the tool memory 355 corresponding to the authentication request 545. The power tool 110 may send an acknowledgment to the wireless dust extractor 105 indicating that the authentication is successful. In some embodiments, other authentication schemes, for example, common-key schemes, public-key schemes, and the like may be used for authentication.

The tool electronic processor 300 sends a request for connection identifier 555 to the wireless dust extractor 105. When the vacuum electronic processor 200 receives the request for connection identifier 555, the vacuum electronic processor 200 determines whether a connection identifier is already generated (at block 560). When the connection identifier is not previously generated, the vacuum electronic processor 200 generates a new random connection identifier (at block 565). The new random connection identifier can be used for all future connections with the wireless dust extractor 105 until all connections with the new random connection identifier are erased by a user. In some embodiments, the vacuum electronic processor 200 generates the random connection identifier at first startup before receiving a request from a power tool 110. This generated random connection identifier is then used for future connections with power tools 110. When the connection identifier was previously generated or once the new random connection identifier is generated, the vacuum electronic processor 200 optionally increments the connection count (at block 570) and responds with the connection identifier 575. In some embodiments, the vacuum electronic processor 200 increments the connection count (at block 570) after receiving an acknowledgment from the power tool 110 that the power tool 110 received the connection identifier 575. When the connection identifier is sent to the power tool 110 and/or when an acknowledgment is received from the power tool 110 that the connection identifier is received by the power tool 110, the vacuum electronic processor 200 provides, using the vacuum indicators 240, a successful wireless connection indication (at block 580). For example, the vacuum electronic processor 200 controls the connection indicator to turn green.

The power tool 110 stores the connection identifier and optionally the MAC address of the dust extractor 105 in the tool memory 355 (at block 585). The tool electronic processor 300 provides, using the tool indicators 340, a successful wireless connection indication (at block 590). For example, the tool electronic processor 300 controls the connection indicator to turn green.

Figure 6A:
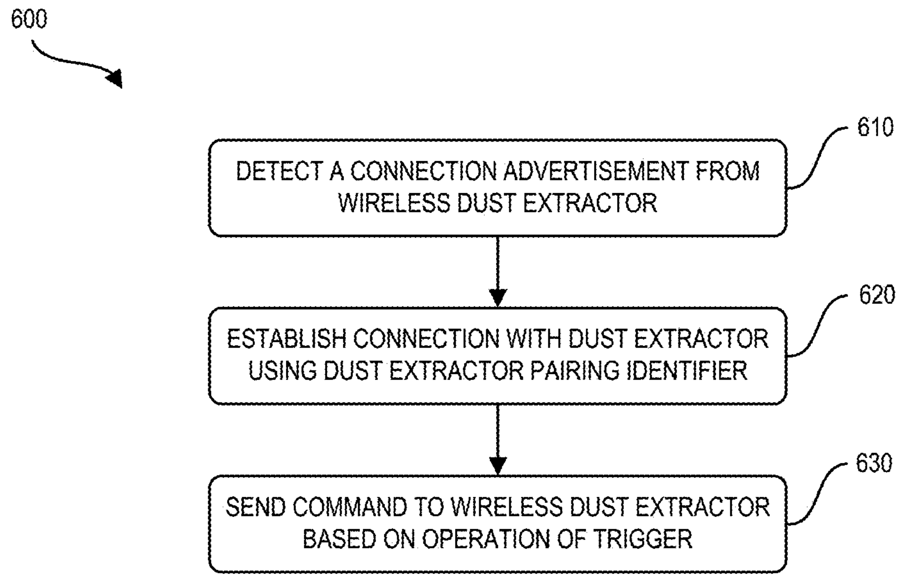
FIG. 6A is a flowchart of a method for concurrent operation between the wireless dust extractor and the power tool of FIG. 1 in accordance with some embodiments.

FIG. 6A is a flowchart of an example method 600 for concurrent operation of the power tool 110 and the wireless dust extractor 105. In the example illustrated, the method 600 includes detecting, using the tool electronic processor 300, a connection advertisement from the wireless dust extractor 105 (at block 610). When the power tool 110 is turned on, the tool electronic processor 300 searches for connected wireless dust extractors 105 and, optionally, the corresponding MAC addresses of the connected wireless dust extractors 105. Specifically, the tool electronic processor 300 searches for connection advertisements from the wireless dust extractor 105.

The method 600 includes establishing, using the tool wireless communication unit 330, a wireless connection with the wireless dust extractor 105 using the connection identifier (at block 620) and, optionally, the corresponding MAC address of the wireless dust extractor 105. The tool electronic processor 300 sends the connection identifier and optionally the corresponding MAC address stored in the tool memory 355 to the wireless dust extractor 105. The wireless connection may be established using a lower level wireless communication protocol, for example, a Bluetooth® protocol or a ZigBee® protocol.

Once the wireless connection between the power tool 110 and the wireless dust extractor 105 is established, the method 600 includes sending, via the tool wireless communication unit 330, commands (e.g., toggle commands or keep-alive commands) to the wireless dust extractor 105 for operation of the wireless dust extractor 105 based on the operation of the trigger 150 (at block 630). The commands may provide an indication of the current operation status of the power tool 110. For example, the command may indicate that the trigger 150 is actuated indicating that the tool motor 390 is operating, or that the trigger 150 is released indicating that the tool motor 390 has stopped. The wireless dust extractor 105 concurrently operates the vacuum motor 290 with the tool motor 390 based on the commands received from the power tool 110.

In some embodiments, the method 600 includes sending periodic keep-alive commands rather than toggle commands. For example, the power tool 110 sends a command to the wireless dust extractor 105 instructing the wireless dust extractor 105 to operate the motor 290 for the next 5 seconds. The power tool 110 then sends another keep-alive command before the 5 seconds expire (for example, at 4 seconds) to instruct the wireless dust extractor 105 to operate the motor 290 for another 5 seconds. In these embodiments, the wireless dust extractor 105 turns off the motor 290 when the 5 second timer expires and no additional keep-alive command from the power tool 110 is received before the time expires. In other embodiments, when a first power tool 110 instructs the wireless dust extractor 105 to turn on, the wireless dust extractor 105 may only be turned off based on receiving a turn off instruction from the first power tool 110. In some embodiments, the wireless dust extractor 105 only communicates with a single power tool 110 at one time.

Figure 6B:
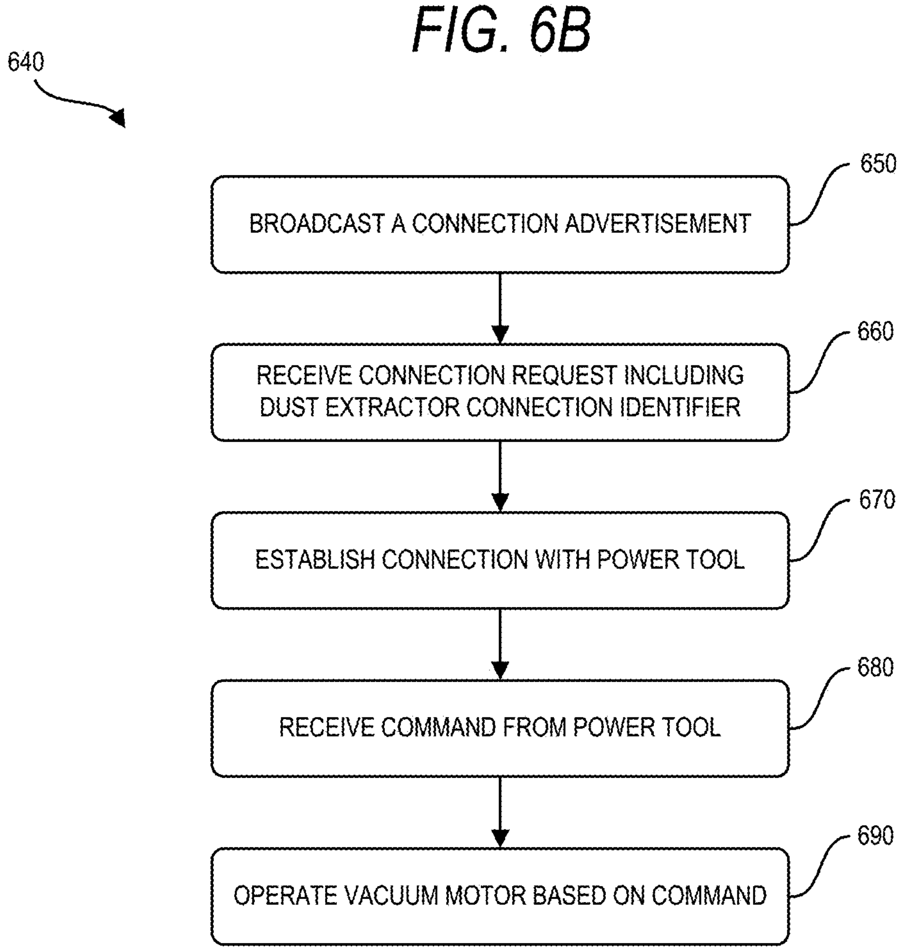
FIG. 6B is a flowchart of a method for concurrent operation between the wireless dust extractor and the power tool of FIG. 1 in accordance with some embodiments.

FIG. 6B is a flowchart of an example method 640 for concurrent operation of the power tool 110 and the wireless dust extractor 105. In the example illustrated, the method 640 includes broadcasting, using the vacuum wireless communication unit 230, a connection advertisement (at block 650). When the wireless dust extractor 105 is turned on, the vacuum electronic processor 200 broadcasts connection advertisements to nearby connected power tools 110 for establishing a connection with the connected power tools 110.

The method 640 includes receiving, via the vacuum wireless communication unit 230, a connection request and the connection identifier from the power tool 110 (at block 660). The vacuum electronic processor 200 receives the connection identifier to verify that the wireless dust extractor 105 is connected with the power tool 110 sending the request. Once verified, the method 640 includes establishing, using the vacuum wireless communication unit 230, a wireless connection with the power tool 110 (at block 670). The wireless connection may be established using a lower level wireless communication protocol, for example, a Bluetooth® protocol or a ZigBee® protocol. In some embodiments, a connection between the wireless dust extractor 105 and the power tool 110 is established without connecting the wireless dust extractor 105 and the power tool 110.

The method 640 includes receiving, via the vacuum wireless communication unit 230, commands from the power tool 110 for operation of the wireless dust extractor 105 (at block 680). As discussed above, the commands indicate or are related to a current operation status of the power tool 110 to the wireless dust extractor 105. Alternatively, the commands include keep-alive messages for operation of the wireless dust extractor 105 The method 640 also includes operating, using the vacuum electronic processor 200, the vacuum motor 290 based on the commands (at block 690). The vacuum electronic processor 200 controls the vacuum motor 290 concurrently with the tool motor 390. For example, the vacuum electronic processor 200 turns on the vacuum motor 290 when the tool motor 390 is turned on, or turns off the vacuum motor 290 when the tool motor 390 is turned off.

Thus, embodiments described herein provide, among other things, communication between a wireless dust extractor and a power tool. Various features and advantages are set forth in the following claims.

What is claimed is:

1. A power tool comprising:

a memory;

a wireless communication unit; and an electronic processor configured to:

establish, via the wireless communication unit, a wireless connection with a dust extractor;

transmit, via the wireless communication unit and after the wireless connection is established, a request for a connection identifier to the dust extractor;

receive, via the wireless communication unit and responsive to the request, a response from the dust extractor, the response including the connection identifier;

store the connection identifier in the memory;

disconnect the wireless connection with the dust extractor;

establish a subsequent wireless connection with the dust extractor after disconnecting the wireless connection with the dust extractor, wherein establishing the subsequent wireless connection with the dust extractor includes transmitting, via the wireless communication unit, the connection identifier to the dust extractor;

provide, after establishing the subsequent wireless connection with the dust extractor, a command, via the wireless communication unit, to the dust extractor, wherein the command instructs the dust extractor to operate a motor of the dust extractor for a first pre-determined period of time; and prior to expiration of the first pre-determined period of time for operating the motor related to the command, retransmit the command to the dust extractor for operating the motor of the dust extractor for a second pre-determined period of time.

2. The power tool of claim 1, further comprising:

a trigger, wherein the electronic processor is further configured to:

provide the command, via the wireless communication unit, to the dust extractor based on an operation of the trigger.

3. The power tool of claim 1, wherein the command includes an indication of a current operation status of the power tool, and wherein the current operation status of the power tool is one selected from a group consisting of an operating status of the motor and a stopped operating status of the motor.

4. The power tool of claim 1, wherein the electronic processor is further configured to: receive, via the wireless communication unit, a media access control (MAC) address of the dust extractor from the dust extractor, wherein the MAC address is included in a connection advertisement or the response, received from the dust extractor.

5. The power tool of claim 1, wherein the electronic processor is further configured to: authenticate the wireless connection based on an authentication scheme.

6. The power tool of claim 5, wherein the authentication scheme includes at least one selected from a group consisting of a challenge-response pair, a common-key scheme, and a public-key scheme.

7. The power tool of claim 1, further comprising: a tool connection button, wherein a connection mode is initiated when the tool connection button is pressed and wherein the electronic processor is further configured to:

search, via the wireless communication unit, for a connection advertisement broadcast from the dust extractor in response to an initiation of the connection mode.

8. The power tool of claim 7, further comprising: a tool indicator; and a housing, wherein the tool connection button and the tool indicator are provided on the housing, and wherein the wireless communication unit and the electronic processor are contained within the housing.

9. The power tool of claim 7, wherein the connection mode is initiated via a smartphone application executing on an external device connected to the power tool via the wireless communication unit.

10. The power tool of claim 1, wherein the wireless connection is established using a lower level wireless communication protocol.

11. A dust extractor comprising:

a motor;

a wireless communication unit; and an electronic processor configured to:

establish, via the wireless communication unit, a wireless connection with a power tool;

receive, via the wireless communication unit and after the wireless connection is established, a request for a connection identifier from the power tool;

provide, via the wireless communication unit and in response to the request, a response to the power tool, the response including the connection identifier;

disconnect the wireless connection with the power tool;

establish a subsequent wireless connection with the power tool after disconnecting the wireless connection with the power tool, wherein establishing the subsequent wireless connection with the power tool includes receiving, via the wireless communication unit, the connection identifier from the power tool;

receive, via the wireless communication unit and after establishing the subsequent wireless connection with the power tool, a command from the power tool, wherein the command includes instructions to operate the motor for a first pre-determined period of time; and prior to expiration of the first pre-determined period of time for operating the motor related to the command, receive a new subsequent command from the power tool for operating the motor for a second pre-determined period of time.

12. The dust extractor of claim 11, wherein the electronic processor is further configured to: stop performing an operation of the motor when the command from the power tool is not received prior to an expiration of the first pre-determined period of time related to the command, wherein the command is provided periodically by the power tool.

13. The dust extractor of claim 11, further comprising:

a memory communicably coupled to the electronic processor, wherein the electronic processor is further configured to:

generate, before providing the response, the connection identifier when the connection identifier is not stored in the memory; and store the connection identifier to the memory.

14. The dust extractor of claim 11, wherein the connection identifier is a static identifier for the dust extractor, and wherein the electronic processor is further configured to: generate the static identifier upon an initial startup of the dust extractor.

15. The dust extractor of claim 11, further comprising:

an extractor indicator, wherein the electronic processor is further configured to:

receive, after providing the response, via the wireless communication unit, an acknowledgment that the connection identifier was received by the power tool, wherein an indication of a successful wireless connection is provided via the extractor indicator after the acknowledgment is received from the power tool.

16. The dust extractor of claim 15, further comprising:

a housing; and a tool connection button, wherein a connection mode is initiated when the tool connection button is pressed, wherein the tool connection button and the extractor indicator are provided on the housing, and wherein the wireless communication unit and the electronic processor are contained within the housing.

17. The dust extractor of claim 15, wherein the electronic processor is further configured to: increment a connection count after providing the response; and provide, via the extractor indicator, an indication of the connection count.

18. The dust extractor of claim 11, wherein the electronic processor is further configured to: provide, via the wireless communication unit, a media access control (MAC) address of the dust extractor to the power tool, wherein the MAC address is included in a broadcast connection advertisement or the response provided to the power tool.

19. A method for connecting and controlling a wireless dust extractor with a power tool, the method comprising:

providing, using a vacuum electronic processor of the wireless dust extractor, a dust extractor connection identifier to the power tool, the dust extractor connection identifier being a static identifier used for connecting the wireless dust extractor with the power tool;

establishing a wireless connection between the power tool and the wireless dust extractor using the dust extractor connection identifier;

sending, using a tool electronic processor of the power tool, a command to the wireless dust extractor, wherein the command instructs the wireless dust extractor to operate a vacuum motor of the wireless dust extractor for a first pre-determined period of time;

controlling, using the vacuum electronic processor, the vacuum motor of the wireless dust extractor for the first pre-determined period of time based on the command; and sending, using the tool electronic processor and prior to expiration of the first pre-determined period of time for operating the vacuum motor related to the command, a new subsequent command to the wireless dust extractor for continuing operating the vacuum motor for a second pre-determined period of time, wherein the vacuum electronic processor controls the vacuum motor based on the new subsequent command.

* * * * *